United States Patent
Lee et al.

(10) Patent No.: US 8,139,652 B2
(45) Date of Patent: Mar. 20, 2012

(54) METHOD AND APPARATUS FOR DECODING TRANSMISSION SIGNALS IN A WIRELESS COMMUNICATION SYSTEM

(75) Inventors: Kang-min Lee, Yongin-si (KR); Sung-jin Kang, Seoul (KR)

(73) Assignee: Seah Networks Co., Ltd., Seoul (KR)

( * ) Notice: Subject to any disclaimer, the term of this patent is extended or adjusted under 35 U.S.C. 154(b) by 903 days.

(21) Appl. No.: 12/158,559

(22) PCT Filed: Dec. 29, 2006

(86) PCT No.: PCT/KR2006/005901
§ 371 (c)(1),
(2), (4) Date: Jun. 20, 2008

(87) PCT Pub. No.: WO2007/075074
PCT Pub. Date: Jul. 5, 2007

(65) Prior Publication Data
US 2008/0279297 A1    Nov. 13, 2008

(30) Foreign Application Priority Data
Dec. 29, 2005 (KR) .......................... 10-2005-0133234

(51) Int. Cl.
*H04B 14/04* (2006.01)
(52) U.S. Cl. .......................... 375/242; 375/260; 375/341
(58) Field of Classification Search .................. 375/242, 375/260, 262, 265, 341
See application file for complete search history.

(56) References Cited

U.S. PATENT DOCUMENTS

| | | | |
|---|---|---|---|
| 6,707,806 B1* | 3/2004 | Kato | 370/336 |
| 2005/0157803 A1* | 7/2005 | Kim et al. | 375/260 |
| 2006/0164970 A1* | 7/2006 | Lee et al. | 370/208 |
| 2007/0010246 A1* | 1/2007 | Churan | 455/427 |
| 2007/0223514 A1* | 9/2007 | Odenwalder et al. | 370/442 |
| 2008/0080363 A1* | 4/2008 | Black et al. | 370/209 |

FOREIGN PATENT DOCUMENTS

| | | |
|---|---|---|
| JP | 11-215012 | 8/1999 |
| KR | 1020030088531 A | 11/2003 |
| KR | 1020040015183 A | 2/2004 |
| KR | 1020040086881 A | 10/2004 |
| WO | WO 02/089389 A1 | 11/2002 |

OTHER PUBLICATIONS

Korean Intellectual Property Office. International Search Report for International Application No. PCT/KR2006/005901, 3 pages (Date completed: Apr. 25, 2007).

* cited by examiner

*Primary Examiner* — Emmanuel Bayard

(57) ABSTRACT

Disclosed is a method and an apparatus for decoding transmission signal. The method includes the steps of: receiving transmission signal including repeated symbols; deinterleaving the received signal; mutually combining the repeated symbols in the deinterleaved signal; and decoding the combined symbols. According to the method, reception performance is improved as compared to a conventional decoding method, and system performance is improved by reducing the loss of frame information included in an FCH.

27 Claims, 5 Drawing Sheets

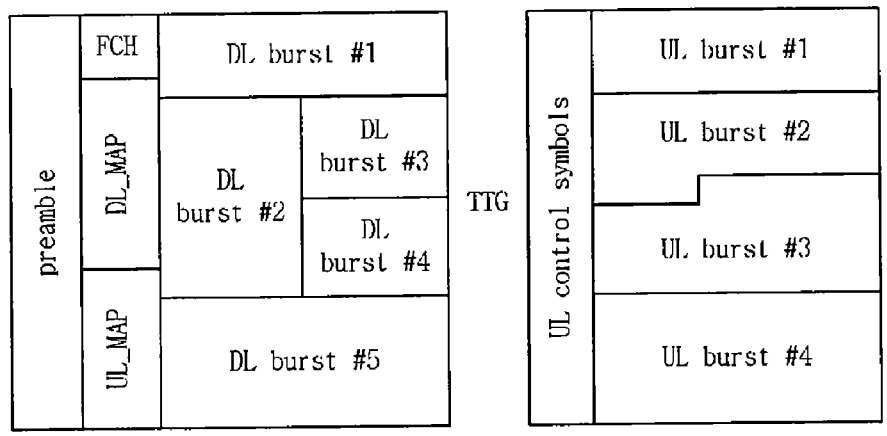
[Fig. 1]
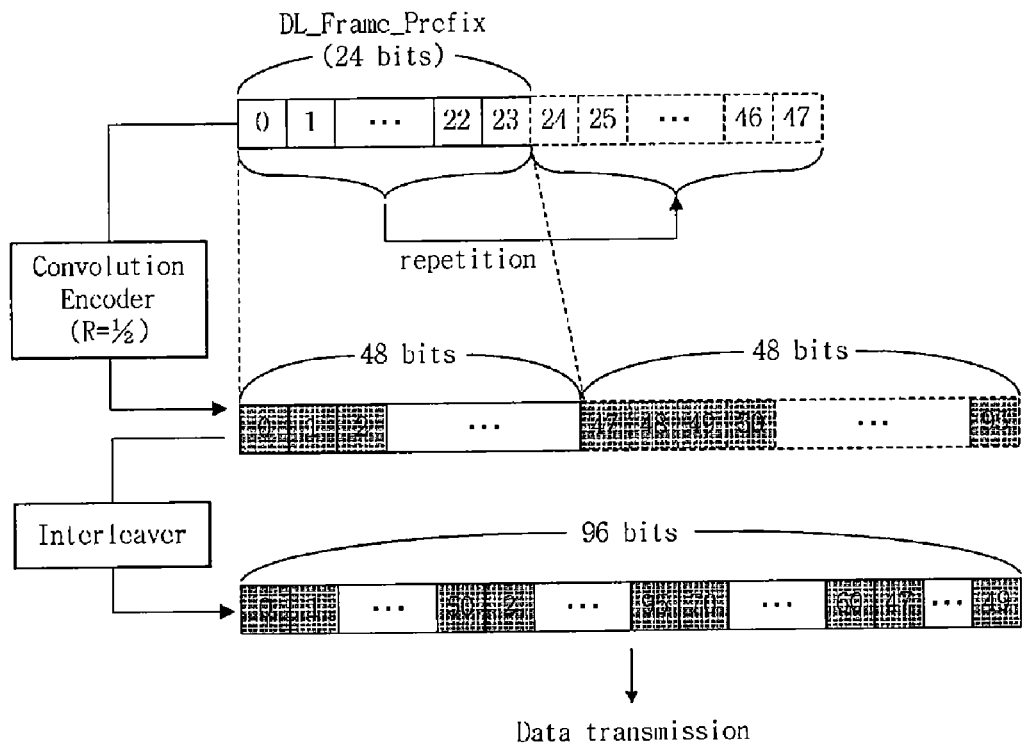
[Fig. 2]

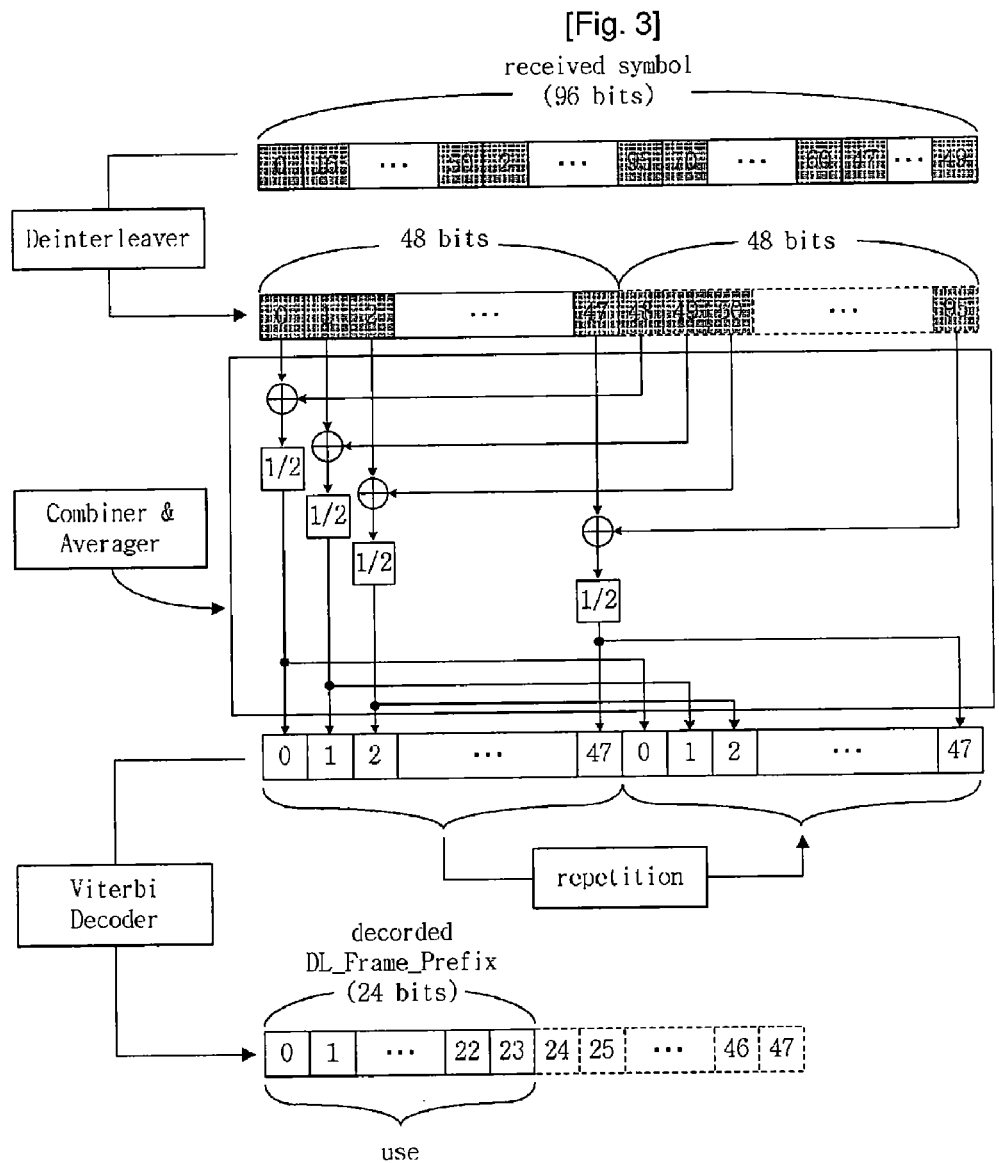

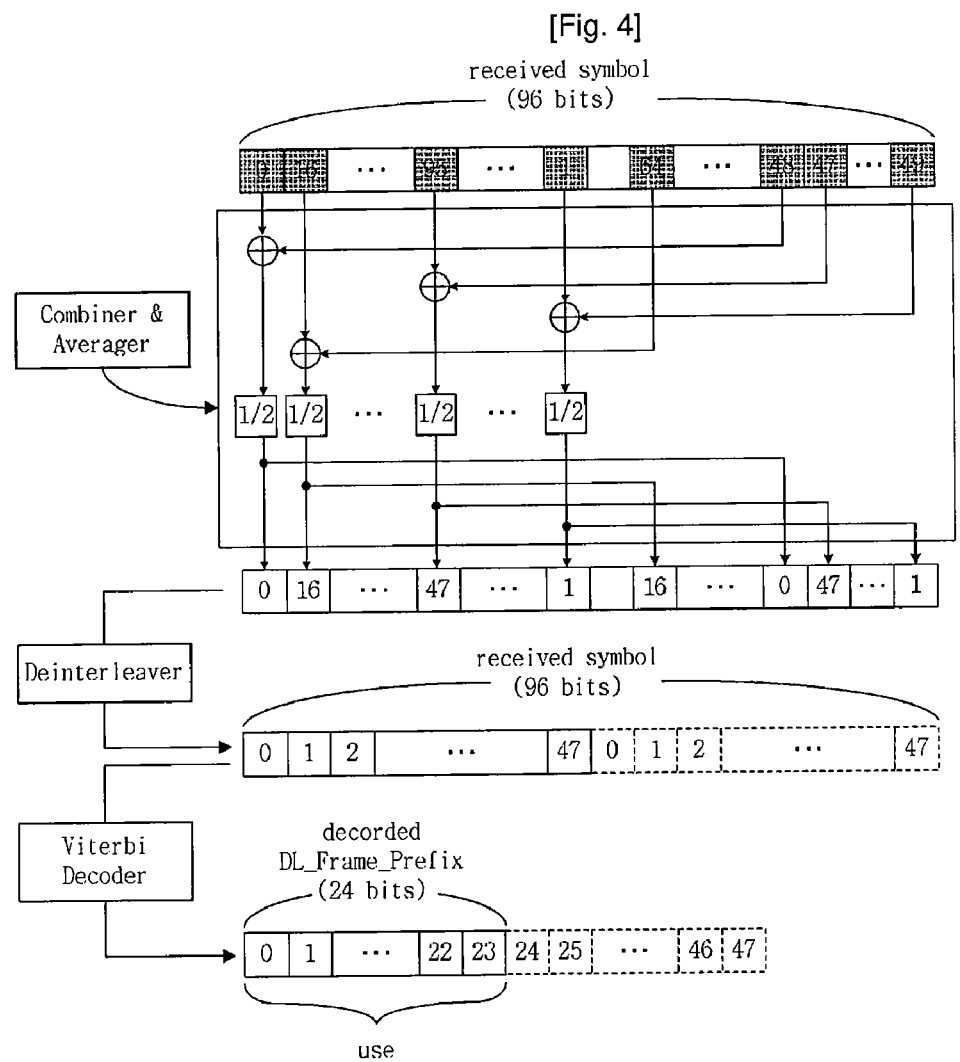

[Fig. 5]
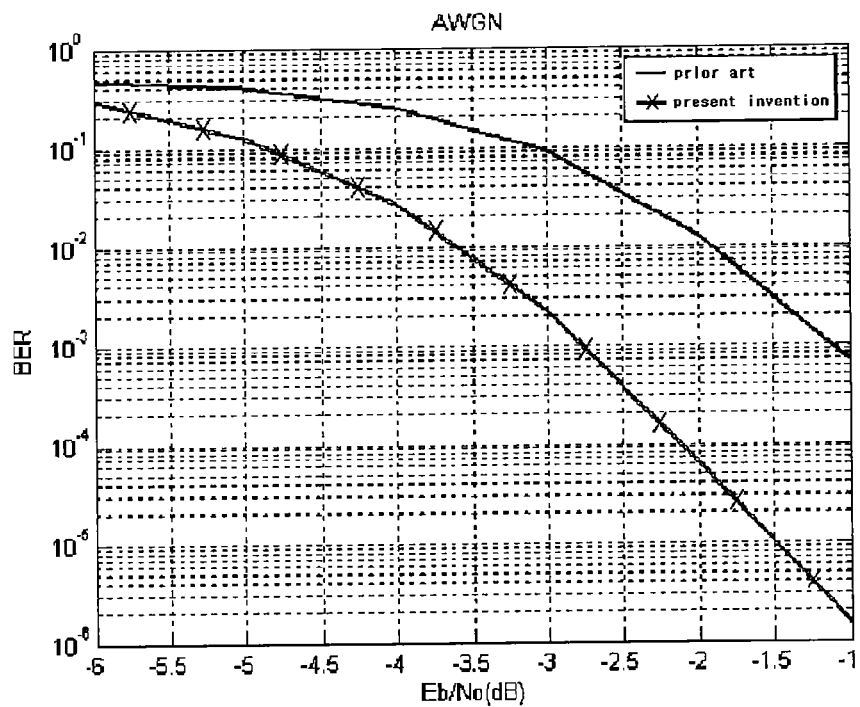
[Fig. 6]
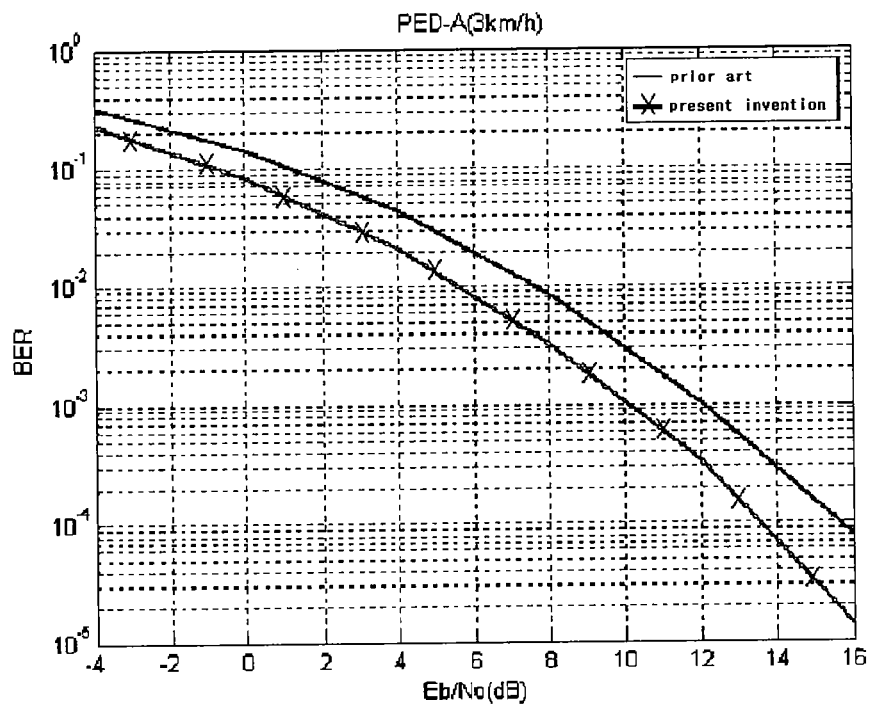

[Fig. 7]
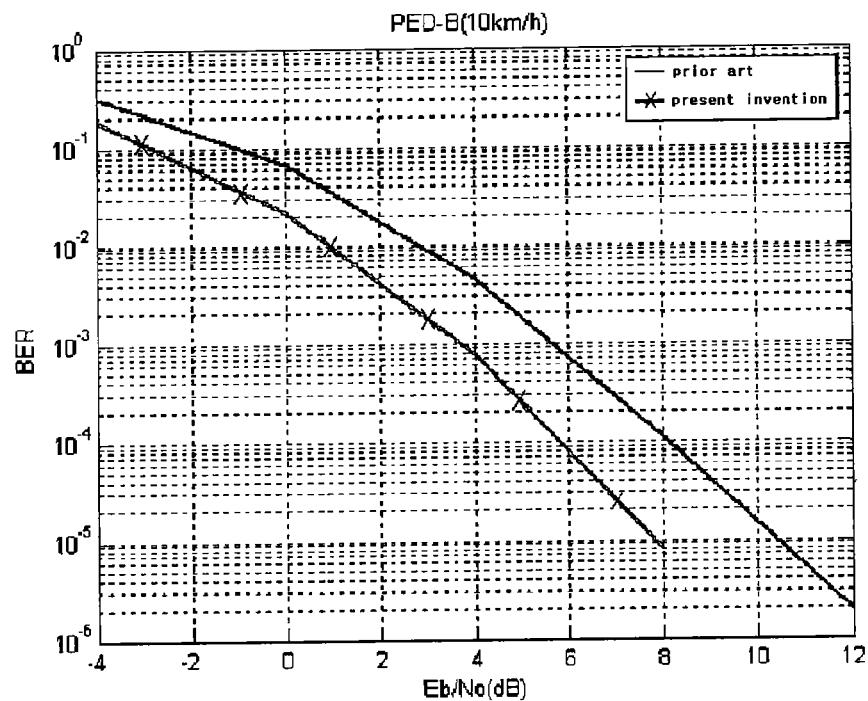
[Fig. 8]
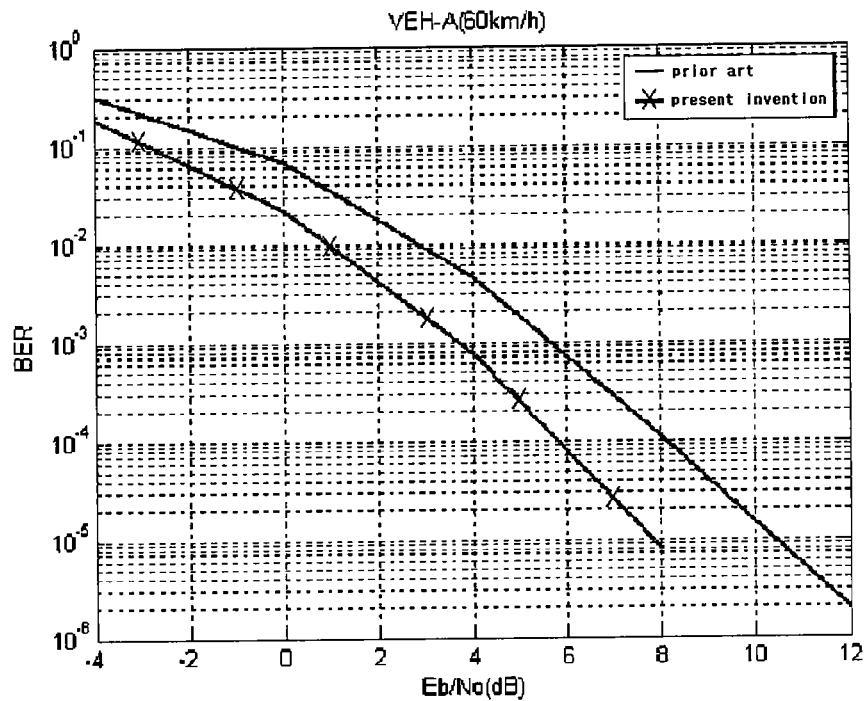

METHOD AND APPARATUS FOR DECODING TRANSMISSION SIGNALS IN A WIRELESS COMMUNICATION SYSTEM

CROSS REFERENCE TO RELATED APPLICATIONS

This application is a US National Stage of International Patent Application No. PCT/KR2006/005901, filed Dec. 29, 2006, which in turn claims the benefit of Korean Patent Application No. 10-2005-0133234, filed Dec. 29, 2005, the disclosures of both applications are incorporated herein by reference.

TECHNICAL FIELD

The present invention relates to a method and an apparatus for decoding transmission information in a wireless communication system, and more particularly to a method and an apparatus for decoding transmission information in a system supporting an Orthogonal Frequency Division Multiplexing (OFDM)/Orthogonal Frequency Division Multiple Access (OFDMA) scheme. In detail, the present invention relates to a method and an apparatus for decoding transmission information using a Frame Control Header (hereinafter, referred to as FCH). In more detail, the present invention relates to a method and an apparatus capable of improving reception performance in various channel environments by combining, averaging and decoding DL_Frame_Prefix information transmitted through an FCH, as compared to a conventional decoding method, and capable of improving the performance of a wireless communication system by reducing the loss of information important for data reception.

BACKGROUND ART

The present invention can be applied to a wireless communication system with a downlink frame structure including an FCH. Such a wireless communication system may include an Institute of Electrical and Electronics Engineers (IEEE) 802.16e-based wireless communication system.

In the present time, the Wibro (portable Internet standard in Korea) configures an IEEE 802.16e-based system in order to provide a high speed data service to users on the move, adopts an OFDMA as a multiple access scheme so that a plurality of users can simultaneously use an Internet service, and adopts Time Division Duplexing (hereinafter, referred to as TDD) as a duplexing scheme, the TDD distinguishing a downlink from an uplink based on time.

FIG. 1 is an exemplary diagram illustrating the frame structure of an uplink and a downlink in a TDD system. Downlink transmission from a Radio Access Station (hereinafter, referred to as RAS) to a Portable Subscriber Station (hereinafter, referred to as PSS) is implemented in a sequence of a preamble, an FCH, a Down Link MAP (DL_MAP), an Up Link MAP (UL_MAP) and a DL burst. Uplink transmission from a PSS to an RAS starts from control symbol transmission, and a Tx/Rx Transition Gap (TTG) for distinguishing uplink transmission time from downlink transmission time is inserted between a downlink and an uplink in the middle of a frame.

Generally, downlink signal in a wireless communication system is transmitted to the receiver of a PSS after having passed through an encoding process for error correction of the downlink signal and an interleaving process for burst error prevention in the transmitter of an RAS.

Then, the downlink signal transmitted from the transmitter of the RAS is received in the receiver of the PSS, and are subjected to a deinterleaving process for restoring signal in their original order by a deinterleaver. The deinterleaved signal is decoded by a Viterbi decoder, so that a code symbol is removed and the original signals are restored.

A signal directly next to a preamble in a downlink frame includes an FCH for transmitting frame configuration information of 24 bits, i.e. a Downlink Frame Prefix DL_Frame_Prefix. The DL_Frame_Prefix transmitted through the FCH corresponds to data early transmitted in each frame, and includes configuration information about a corresponding frame.

Since the DL_Frame_Prefix transmitted through the FCH is arranged in the front portion of the frame and includes important information about a corresponding frame, it is utilized as very important information in later reception processes for receiving a series of data including an entire frame. Accordingly, the DL_Frame_Prefix requires superior reception performance for various channel environments as compared to other parts of transmission data.

However, a conventional signal transmission/reception scheme has not provided a separate reception performance improvement scheme for the DL_Frame_Prefix information transmitted through the FCH. Therefore, when the DL_Frame_Prefix information is not normally received depending on transmission/reception channel environments, the entire reception performance of a system may deteriorate.

DISCLOSURE OF INVENTION

Technical Problem

The present invention relates to an apparatus and a method for decoding transmission information in a wireless communication system in order to solve the technical requirements as described above, and more particularly to a method and an apparatus for decoding transmission information in a system supporting an OFDMI OFDMA scheme.

In detail, the present invention relates to a method and an apparatus for decoding information transmitted using an FCH. It is an object of the present invention to improve reception performance of an FCH including DL_Frame_Prefix information by combining and decoding the DL_Frame_Prefix information repeatedly transmitted through the FCH, as compared to a conventional decoding method, and to improve system performance by preventing the loss of information important for data reception.

Further, it is another object of the present invention to provide a reception a method and an apparatus capable of improving the reception performance of corresponding information by mutually combining frame intervals including information requiring superior reception performance, as compared to a conventional reception method.

Technical Solution

In order to accomplish these objects, there is provided a method for decoding transmission signal, the method including the steps of: receiving the transmission signal including repeated symbols; deinterleaving the received signal; mutually combining the repeated symbols in the deinterleaved signal; and decoding the combined symbols.

In order to accomplish these objects, there is provided a method for decoding transmission signals, the method including the steps of: receiving transmission signal including repeated symbols; mutually combining the repeated symbols in the received signal; deinterleaving the combined symbols; and decoding the deinterleaved symbols.

In order to accomplish these objects, there is provided a method for transmitting/receiving downlink signal in a wireless communication system, the method comprising the steps of: forming two N-bit blocks by repeating an N-bit block including N (positive integer) symbols including frame configuration information; forming an encoded signal of two NM-bit blocks by encoding an input signal including the two N-bit blocks by a code rate of 1/M (M is positive real number); interleaving the encoded signal to form a interleaved output of two NM-bit blocks; allocating the interleaved output to an FCH, and transmitting the FCH through downlink signal; receiving the downlink signal; generating a deinterleaved output of the two NM-bit blocks by deinterleaving the received downlink signal; mutually combining and averaging repeated symbols of the deinterleaved output; reconfiguring two NM-bit blocks by repeating the averaged symbols; restoring two N-bit blocks by decoding the deinterleaved output of the reconfigured two NM-bit blocks; and obtaining the frame configuration information from the restored N-bit blocks.

In order to accomplish these objects, there is provided a method for transmitting/receiving downlink signals in a wireless communication system, the method comprising the steps of: forming two N-bit blocks by repeating an N-bit block including N (positive integer) symbols having frame configuration information; forming an encoded signal of two NM-bit blocks by encoding input signal including the two N-bit blocks by a code rate of 1/M (M is positive real number); interleaving the encoded input signal to form a interleaved output of two NM-bit blocks; allocating the interleaved output to an FCH, and transmitting the FCH through downlink signal; receiving the downlink signal including the FCH to which the two NM-bit blocks are allocated; mutually combining and averaging repeated symbols in the two NM-bit blocks included in the received downlink signal; reconfiguring two NM-bit blocks by repeating the averaged symbols; generating a deinterleaved output of the two repeated NM-bit blocks by deinterleaving the reconfigured two NM-bit blocks; restoring two N-bit blocks by decoding the deinterleaved output; and obtaining the frame configuration information from the restored N-bit blocks.

In order to accomplish these objects, there is provided a receiver comprising: a deinterleaver for deinterleaving a transmission signal including repeated symbols; a combiner for mutually combining the repeated symbols in the deinterleaved signal; and a decoder for decoding the combined symbols.

In order to accomplish these objects, there is provided a receiver comprising: a combiner for mutually combining repeated symbols in transmission signal including the repeated symbols; a deinterleaver for deinterleaving the transmission signal including the combined symbols; and a decoder for decoding the deinterleaved signal.

In order to accomplish these objects, there is provided a wireless communication system comprising: a transmitter; and a receiver, wherein the transmitter comprises: a repetition means for forming two N-bit blocks by repeating an N-bit block including N (positive integer) symbols; an encoding means for forming encoded signal of two NM-bit blocks by encoding input signal including the two N-bit blocks by a code rate of 1/M (M is positive real number); an interleaving means for interleaving the encoded input signal to generate interleaved output of two NM-bit blocks; and a transmission means for allocating the interleaved output to an FCH, and transmitting the FCH through a downlink signal, wherein the receiver comprises: a reception means for receiving the downlink signal; a deinterleaving means for generating deinterleaved output of two NM-bit blocks by deinterleaving the received downlink signal; a combining means for mutually combining repeated symbols of the deinterleaved output; and a decoding means for restoring two N-bit blocks by decoding the deinterleaved output of the two combined NM-bit blocks.

In order to accomplish these objects, there is provided a wireless communication system comprising: a transmitter; and a receiver, wherein the transmitter comprises: a repetition means for forming two N-bit blocks by repeating an N-bit block including N (positive integer) symbols; an encoding means for forming encoded signal of two NM-bit blocks by encoding input signal including the two N-bit blocks by a code rate of 1/M (M is positive real number); an interleaving means for interleaving the encoded input signal to form interleaved output of two NM-bit blocks; and a transmission means for allocating the interleaved output to an FCH, and transmitting the FCH through downlink signal, wherein the receiver comprises: a reception means for receiving the downlink signal; a combining means for mutually combining repeated symbols in the two NM-bit blocks included in the received downlink signal; a deinterleaving means for generating deinterleaved output of two NM-bit blocks by deinterleaving the combined two NM-bit blocks; and a decoding means for restoring two N-bit blocks by decoding the deinterleaved output.

Advantageous Effects

According to the present Invention, it is possible to improve the performance of a wireless communication system by reducing the loss of information important for data reception.

Further, according to the present Invention, it is possible to improve the reception performance of an FCH including frame configuration information, i.e. DL_Frame_Prefix information, and to improve the performance of a wireless communication system by preventing the loss of information important for data reception.

Furthermore, according to the present Invention, it is possible to improve the reception performance of information by mutually combining frame intervals including information requiring superior reception performance, as compared to a conventional reception method.

BRIEF DESCRIPTION OF THE DRAWINGS

The foregoing and other objects, features and advantages of the present invention will become more apparent from the following detailed description when taken in conjunction with the accompanying drawings in which:

FIG. 1 is an exemplary diagram illustrating the frame structure of an uplink and a downlink in a TDD system;

FIG. 2 is a diagram illustrating the construction of a transmitter according to the present invention;

FIG. 3 is a diagram illustrating the construction of a receiver according to a first embodiment of the present invention;

FIG. 4 is a diagram illustrating the construction of a receiver according to a second embodiment of the present invention; and FIGS. 5 to 8 are graphs illustrating a relation between a Bit Error Rate (BER) and a signal to noise ratio (Eb/No) in various channel environments when using a receiver according to a first or a second embodiment of the present invention.

MODE FOR THE INVENTION

Hereinafter, an exemplary embodiment of the present invention will be described in detail with reference to the accompanying drawings. Well known functions and constructions are not described in detail since they would obscure the invention in unnecessary detail.

FIG. 2 is a diagram illustrating a signal processing procedure performed by the transmitter of the present invention in order to transmit a DL_Frame_Prefix through an FCH.

The DL_Frame_Prefix has a size of 24 bits. In order to form a block of 48 bits which is a minimum block size for Forward Error Correction (FEC), 24 bits are simply repeated to form encoder input signal of 48 bits. Then, a convolutional encoder provides a code symbol of 2 bits per one bit to the input signal by using a convolutional code for error correction and employing a code rate of ½, thereby forming two 48 bit-blocks. Next, the two 48 bit-blocks are interleaved by a block interleaver in order to prevent burst errors, converted to one 96 bit-block, and then transmitted from the transmitter through the FCH.

The table 1 below shows the exemplary configuration and use of the DL_Frame_Prefix information passing through such a signal processing procedure.

TABLE 1

| Syntax | Size | Notes |
|---|---|---|
| DL_Frame_Prefix_Format( ){ | | |
| Used subchannel bitmap | 6 bits | Bit #0 : Subchannel group0 |
| | | Bit #1 : Subchannel group1 |
| | | Bit #2 : Subchannel group2 |
| | | Bit #3 : Subchannel group3 |
| | | Bit #4 : Subchannel group4 |
| | | Bit #5 : Subchannel group5 |
| Ranging_Change_Indication | 1 bit | |
| Repetition_Coding_Indication | 2 bits | 00-No repetition coding on DL-MAP01-Repetition coding of 2 used on DL-MAP10-Repetition coding of 4 used on DL-MAP11-Repetition coding of 6 used on DL-MAP |
| Coding_Indication | 3 bits | 0b000 : CC encoding used on DL-MAP0b001 : BTC encoding used on DL-MAP0b010 : CTC encoding used on DL-MAP0b011: ZTOC used on DL-MAP0b100 : LDPC encoding used on DL-MAP0b101 to 0b111-Reserved |
| DL_MAP_Length | 8 bits | |
| reserved | 4 bits | Shall be set to zero. |
| } | | |

Used subchannel bitmap: used subchannel group

Ranging_Change_Indication: change of domain allocation in current frame relating to a periodic ranging/bandwidth uplink request, compared to previous frame Repetition_Change_Indication: number of repetition codings used on DL_MAP repetition coding(endocding)

Coding_Indication: coding scheme used on DL_MAP

DL_MAP_Length: length of DL_MAP message indicated by the slot

As described above, the DL_Frame_Prefix transmitted through the FCH includes configuration information of a corresponding frame.

The DL_Frame_Prefix information is repeated before being inputted to the convolutional encoder, and then transmitted through the FCH. In this way, the DL_Frame_Prefix information is transmitted through the FCH without passing through a randomization process differently from other information signal of a downlink frame, so that a receiver can improve reception performance by combining respective repeated symbols.

FIG. 3 is a diagram illustrating the construction of a receiver for receiving downlink transmission signal including the FCH according to a first embodiment of the present invention.

For convenience of description, FIG. 3 illustrates only a deinterleaver and a decoder, which are elements directly connected to the decoding method of the present invention, and a signal combiner and an averager according to the present invention.

A received signal in the receiver of FIG. 3 is passed through the signal processing procedure (repetition of DL_Frame_Prefix, convolution encoding and interleaving) performed by the transmitter of FIG. 2. The signal is comprised of one 96-bit block.

The signal of the 96-bit block is rearranged in the deinterleaver to form two 48-bit blocks which have the same data order as 96-bit block after encoding process in the transmitter. Each symbol of the 48-bit block in the latter half of the 96-bit block has a construction in which symbols of the 48-bit block in the frust half thereof are repeated.

Then, the respective symbols repeated in the first half and the latter half thereof are added and averaged by using the symbol combiner and the averager, and the same 48 symbols are repeated twice. That is, a process, in which symbol 0 and symbol 48 are added and averaged (i.e. multiplied by ½), symbol 1 and symbol 49 are added and averaged, and symbol 2 and symbol 50 are added and averaged, is repeated until symbol 47 and symbol 95 are added and averaged, so that the 48-bit block of the first half and the 48-bit block of the latter half are reconfigured. In addition to this method, those skilled in the art may also use other methods for combining repeated symbols for normalization.

Further, the 48-bit block of the first half and the 48-bit block of the latter half are simultaneously generated, so that a repeated configuration can be obtained without a separate repetition process.

The signal including the 96 symbols reconfigured in this way is decoded by the Viterbi decoder so as to restore the original 48-bit block. Accordingly, 24-bit DL_Frame_Prefix information is obtained from the 48-bit block for use.

Differently from the first embodiment, the symbol combination and averaging of the present invention may also be performed before the deinterleaving and decoding. Such a case is exampled in the second embodiment of the present invention. FIG. 4 is a diagram illustrating the construction of a receiver according to the second embodiment of the present invention.

Similarly to the case of FIG. 3, a received signal in the receiver of FIG. 4 is passed through the signal processing procedure (repetition of DL_Frame_Prefix, convolution encoding and interleaving). The signal is comprised of one 96-bit block.

For example, the received signal is rearranged into 96-bit block through combination and normalization processes in such a manner that respective repeated symbols are added and averaged using a symbol combiner and an averager. The received signal is inputted in such a manner that the symbols of the first half and the latter half are interleaved, the symbols mixed by interleaving rules, i.e. the symbols in combination positions, are combined and averaged, and are then stored in respective corresponding positions. That is, a process, in which reception symbols in positions corresponding to symbols 0 and 48 are added and averaged, and reception symbols in positions corresponding to symbols 1 and 49 are added and averaged, is repeated until reception symbols in positions corresponding to symbols 47 and 95 are finally added and averaged, and averaging results are stored in the positions including the respective symbols, so that the 96-bit block is reconfigured.

Next, the signal of the 96-bit block is rearranged in the deinterleaver to form two 48-bit blocks which have the same data order as 96-bit block after encoding process in the transmitter. The symbols of the 48-bit block of the latter half thereof are arranged in the same order as that of the symbols of the 48-bit block of the first half thereof.

Last, the signal including the 96 symbols reconfigured in this way is decoded by the Viterbi decoder so as to restore the original 48-bit block. Accordingly, 24-bit DL_Frame_Prefix information is obtained from the 48-bit block for use.

FIGS. 5 to 8 are graphs illustrating a relation between a BER and an Eb/No in various channel environments in case of using the receiver according to the first or the second embodiment of the present invention. FIG. 5 is a graph illustrating the simulation results in an Additive White Gaussian Noise (hereinafter, referred to as AWGN) environment, FIG. 6 is a graph illustrating the simulation results in an environment in which a user walks with a speed of 3 km/h, FIG. 7 is a graph illustrating the simulation results in an environment in which a user runs with a speed of 10 km/h, and FIG. 8 is a graph illustrating the simulation results in a vehicle traveling with a speed of 60 km/h.

According to all the cases, the reception method based on the present invention shows a BER superior to that of the conventional reception method. Further, the Eb/No has also been improved more than 1.5 dB at minimum in an AWGN environment. Specifically, reception performance of more than 2 dB can be improved in a walking environment, a vehicle traveling environment, etc.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A computer-implemented method for decoding a transmission signal, the method comprising:
   receiving, using a computer processor, the transmission signal, which is formed by repeating symbols including downlink frame prefix information, encoding repeated symbols to form encoding blocks, and interleaving the encoding blocks;
   deinterleaving, using a computer processor, the received transmission signal;
   combining, using a computer processor, symbols at the same positions of deinterleaved encoding blocks among the repeated symbols in the deinterleaved transmission signal; and
   decoding, using a computer processor, the combined symbols.

2. A computer-implemented method for decoding a transmission signal, the method comprising:
   receiving, using a computer processor, the transmission signal, which is formed by repeating symbols including downlink frame prefix information, encoding repeated symbols to form encoding blocks, and interleaving the encoding blocks;
   combining, using a computer processor, symbols at the same combination positions of interleaved encoding blocks among the repeated symbols in the received signal;
   deinterleaving, using a computer processor, the combined symbols; and
   decoding, using a computer processor, the deinterleaved symbols.

3. The computer-implemented method as claimed in claim 1 or 2, wherein the repeated symbols included in the transmission signal are formed through a repetition process of symbols before encoding in a transmitter.

4. The computer-implemented method as claimed in claim 3, wherein the repeated symbols correspond to information transmitted using a frame control header (FCH).

5. The computer-implemented method as claimed in claim 4, wherein the repeated symbols include configuration information of a corresponding frame.

6. The computer-implemented method as claimed in claim 3, wherein the combining of the repeated symbols comprises adding and averaging the repeated symbols.

7. The computer-implemented method as claimed in claim 6, further comprising:
   repeating the averaged symbols after averaging the repeated symbols.

8. The computer-implemented method as claimed in claim 3, wherein the transmission signal is a downlink signal in an IEEE 802.16e-based wireless communication system.

9. The computer-implemented method as claimed in claim 8, wherein the IEEE 802.16e-based wireless communication system employs orthogonal frequency division multiplexing access (OFDMA) and time division duplexing (TDD) schemes.

10. A computer-implemented method for transmitting/receiving a downlink signal in a wireless communication system, the method comprising:
   forming, using a computer processor, two N-bit blocks by repeating an N-bit block including N symbols including downlink frame prefix information, N being a positive integer;
   forming, using a computer processor, an encoded signal of two NM-bit blocks by encoding the two N-bit blocks by a code rate of 1/M, M being a positive real number;
   interleaving, using a computer processor, the encoded signal to form an interleaved output of two NM-bit blocks;
   allocating, using a computer processor, the interleaved output to an FCH, and transmitting the FCH using the downlink signal;
   receiving, using a computer processor, the downlink signal;
   forming, using a computer processor, a deinterleaved output of the two NM-bit blocks by deinterleaving the received downlink signal;
   combining and averaging, using a computer processor, symbols at the same positions of the two NM-bit blocks of the deinterleaved output;
   reconfiguring, using a computer processor, two NM-bit blocks by repeating the averaged symbols;
   restoring, using a computer processor, two N-bit blocks by decoding the deinterleaved output of the reconfigured two NM-bit blocks; and
   obtaining, using a computer processor, the downlink frame information from the restored N-bit blocks.

11. A computer-implemented method for transmitting/receiving a downlink signal in a wireless communication system, the method comprising:
  forming, using a computer processor, two N-bit blocks by repeating an N-bit block including N symbols having downlink frame prefix information, N being a positive integer;
  forming, using a computer processor, an encoded signal of two NM-bit blocks by encoding the two N-bit blocks by a code rate of 1/M, M being a positive real number;
  interleaving, using a computer processor, the encoded input signal to form an interleaved output of two NM-bit blocks;
  allocating, using a computer processor, the interleaved output to an FCH, and transmitting the FCH using the downlink signal;
  receiving, using a computer processor, the downlink signal including the FCH to which the two NM-bit blocks are allocated;
  combining and averaging, using a computer processor, repeated symbols at the same combination positions in the two NM-bit blocks included in the received downlink signal;
  reconfiguring, using a computer processor, two NM-bit blocks by repeating the averaged symbols;
  forming, using a computer processor, a deinterleaved output by deinterleaving the reconfigured two NM-bit blocks;
  restoring, using a computer processor, two N-bit blocks by decoding the deinterleaved output; and
  obtaining, using a computer processor, the downlink frame prefix information from the restored N-bit blocks.

12. The computer-implemented method as claimed in claim 10 or 11, wherein the wireless communication system is an IEEE 802.16e-based wireless communication system.

13. The computer-implemented method as claimed in claim 12, wherein the IEEE 802.16e-based wireless communication system employs OFDMA and TDD schemes.

14. A receiver comprising:
  a deinterleaver configured to deinterleave a transmission signal, which is formed by repeating symbols including downlink frame prefix information, encoding repeated symbols to form encoding blocks, and interleaving the encoding blocks;
  a combiner configured to combine symbols at the same positions of deinterleaved encoding blocks among the repeated symbols in the deinterleaved signal; and
  a decoder configured to decode the combined symbols.

15. A receiver comprising:
  a combiner for configured to combine symbols at the same combination positions of interleaved encoding blocks among repeated symbols in a transmission signal, which is formed by repeating symbols including downlink frame prefix information, encoding repeated symbols to form encoding blocks, and interleaving the encoding blocks;
  a deinterleaver configured to deinterleave the transmission signal including the combined symbols; and
  a decoder configured to decode the deinterleaved transmission signal.

16. The receiver as claimed in claim 14 or 15, wherein the repeated symbols included in the transmission signal are formed through a repetition process of symbols before encoding in a transmitter.

17. The receiver as claimed in claim 16, wherein the repeated symbols correspond to information transmitted using an FCH.

18. The receiver as claimed in claim 17, wherein the repeated symbols include configuration information of a corresponding frame.

19. The receiver as claimed in claim 16, wherein the combiner adds and averages the repeated symbols.

20. The receiver as claimed in claim 19, wherein the combiner repeats the averaged symbols.

21. The receiver as claimed in claim 16, wherein the transmission signal is a downlink signal in an IEEE 802.16e-based wireless communication system.

22. The receiver as claimed in claim 21, wherein the IEEE 802.16e-based wireless communication system employs OFDMA and TDD schemes.

23. A wireless communication system comprising:
  a transmitter; and
  a receiver,
  wherein the transmitter comprises:
  a repetition unit configured to form two N-bit blocks by repeating an N-bit block including N symbols including downlink frame prefix information, N being a positive integer;
  an encoding unit configured to form an encoded signal of two NM-bit blocks by encoding the two N-bit blocks by a code rate of 1/M, M being a positive real number;
  an interleaving unit configured to interleave the encoded signal to form an interleaved output of two NM-bit blocks; and
  a transmission unit configured to allocate the interleaved output to an FCH, and transmit the FCH using a downlink signal, and
  wherein the receiver comprises:
  a reception unit configured to receive the downlink signal;
  a deinterleaving unit configured to form a deinterleaved output of two NM-bit blocks by deinterleaving the received downlink signal;
  a combining unit configured to combine repeated symbols at the same positions of the two NM-bit blocks of the deinterleaved output; and
  a decoding unit configured to restore two N-bit blocks by decoding the two combined NM-bit blocks.

24. A wireless communication system comprising:
  a transmitter; and
  a receiver,
  wherein the transmitter comprises:
  a repetition unit configured to form two N-bit blocks by repeating an N-bit block including N symbols including downlink frame prefix information, N being a positive integer;
  an encoding unit configured to form an encoded signal of two NM-bit blocks by encoding the two N-bit blocks by a code rate of 1/M, M being a positive real number;
  an interleaving unit configured to interleave the encoded signal to form an interleaved output of two NM-bit blocks; and
  a transmission unit configured to allocate the interleaved output to an FCH, and transmit the FCH using a downlink signal, and
  wherein the receiver comprises:
  a reception unit configured to receive the downlink signal;
  a combining unit configured to combine repeated symbols at the same positions of the two NM-bit blocks included in the received downlink signal;

a deinterleaving unit configured to form a deinterleaved output of two NM-bit blocks by deinterleaving the combined two NM-bit blocks; and a decoding unit configured to restore two N-bit blocks by decoding the deinterleaved output.

25. The wireless communication system as claimed in claim 23 or 24, wherein a block allocated to the FCH and transmitted by the transmission unit in the transmitter includes configuration information of a corresponding frame, and the decoding unit of the receiver obtains the configuration information from the restored two N-bit blocks.

26. The wireless communication system as claimed in claim 25, wherein the combining unit in the receiver adds and averages the repeated symbols, and repeats the averaged symbols.

27. The wireless communication system as claimed in claim 26, wherein the wireless communication system is an IEEE 802.16e-based wireless communication system, and employs OFDMA and TDD schemes.

* * * * *